US012632190B2

(12) United States Patent
Dutta et al.

(10) Patent No.: US 12,632,190 B2
(45) Date of Patent: May 19, 2026

(54) ACHIEVING UNIFORM BANDWIDTH USING BLENDED MEMORY BLOCKS FOR RELOCATION OPERATIONS

(71) Applicant: Sandisk Technologies, Inc., Milpitas, CA (US)

(72) Inventors: Bishwajit Dutta, Bengaluru (IN); Akhilesh Yadav, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/426,768

(22) Filed: Jan. 30, 2024

(65) Prior Publication Data

US 2025/0244896 A1      Jul. 31, 2025

(51) Int. Cl.
*G06F 3/06* (2006.01)
*G06F 12/02* (2006.01)

(52) U.S. Cl.
CPC ............ *G06F 3/064* (2013.01); *G06F 3/0647* (2013.01); *G06F 12/0246* (2013.01); *G06F 12/0253* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,753,847 | B2 * | 9/2017 | Syu | G06F 12/0246 |
| 10,739,996 | B1 * | 8/2020 | Ebsen | G06F 16/1727 |
| 2011/0145473 | A1 * | 6/2011 | Maheshwari | G11C 7/1072 711/E12.008 |
| 2012/0297122 | A1 * | 11/2012 | Gorobets | G06F 3/068 711/E12.008 |
| 2016/0124848 | A1 * | 5/2016 | Bellorado | G06F 12/0246 711/103 |
| 2016/0210060 | A1 * | 7/2016 | Dreyer | G06F 3/0659 |
| 2017/0003911 | A1 * | 1/2017 | Uchigaito | G06F 3/0688 |
| 2018/0113620 | A1 * | 4/2018 | Kwon | G06F 3/0685 |
| 2019/0155521 | A1 * | 5/2019 | Bahirat | G06F 3/0619 |
| 2019/0354311 | A1 * | 11/2019 | Ji | G06F 3/0658 |
| 2019/0391756 | A1 * | 12/2019 | Wang | G06F 3/0659 |
| 2020/0097403 | A1 * | 3/2020 | Saxena | G06F 12/0246 |
| 2021/0303185 | A1 * | 9/2021 | Mishra | G06F 3/0659 |

(Continued)

*Primary Examiner* — Yaima Rigol

(74) *Attorney, Agent, or Firm* — DENTONS Durham Jones Pinegar

(57) ABSTRACT

A data storage device includes a bandwidth balancing system operable to reduce or eliminate bandwidth availability fluctuations that occur as a result of the performance of various internal operations and host operations. The bandwidth balancing system reduces or eliminates bandwidth availability fluctuations using a randomness factor. The randomness factor is a value that indicates a probability that an entire memory block will be invalidated by a single operation, which would cause the validity count of the memory block to significantly drop, thereby causing bandwidth availability fluctuations. The bandwidth balancing system ensures the memory blocks have a desired randomness factor by enabling the memory blocks to store both random data and sequential data. Specifically, the bandwidth balancing system intelligently mixes random data and sequential data within a memory block to achieve the desired randomness factor.

20 Claims, 7 Drawing Sheets

(56) References Cited

U.S. PATENT DOCUMENTS

| | | | | |
|---|---|---|---|---|
| 2022/0066648 A1* | 3/2022 | Gunda | ................ | G11C 11/5635 |
| 2023/0333979 A1* | 10/2023 | Shin | .................... | G06F 12/0246 |
| 2024/0045799 A1* | 2/2024 | Cariello | ............. | G06F 12/0246 |
| 2024/0160563 A1* | 5/2024 | Kochar | ............... | G06F 12/0253 |
| 2025/0130719 A1* | 4/2025 | Gundecha | ............. | G06F 3/0644 |

* cited by examiner

600

ACHIEVING UNIFORM BANDWIDTH USING BLENDED MEMORY BLOCKS FOR RELOCATION OPERATIONS

BACKGROUND

A data storage device, such as a NAND data storage device, typically includes two partitions—a cache partition and a primary storage partition. Host operations, such as write operations, are initially performed on the cache partition. Data that is written to the cache partition is eventually transferred or relocated to the primary storage partition using one or more internal operations (e.g., relocation operations and/or garbage collection operations).

Typically, the data storage device has a fixed amount of bandwidth available for executing operations. As such, the available bandwidth is split between execution of the host operations and execution of the internal operations. However, in some instances, bandwidth requirements of the internal operations can negatively impact the performance or execution of the host operations.

For example, a memory block includes a validity count (e.g., metadata associated with the memory block that tracks the amount of valid data in the memory block). In some situations, the validity count of the memory block impacts the amount of bandwidth that is required to perform various internal operations. For example, if the validity count of one or more memory blocks drops below a validity count threshold, or if a large number of memory blocks are invalidated, a significant amount of bandwidth may be required to perform various relocation operations and/or garbage collection operations. As a result, there is less bandwidth available for performing host operations.

Thus, as bandwidth requirements for internal operations fluctuate (e.g., based on validity counts), the bandwidth availability for host operations also fluctuates. As a result, the overall performance of the data storage device is negatively impacted.

Accordingly, it would be beneficial for a data storage device to store data in such a way as to avoid bandwidth availability fluctuations.

SUMMARY

The present application describes a bandwidth balancing system for a data storage device, such as a NAND data storage device. In an example, the bandwidth balancing system is operable to reduce or eliminate bandwidth fluctuations or variations that occur as a result of the performance of various internal operations (e.g., garbage collection and/or relocation operations).

For example, variations of validity counts between memory blocks that are selected for internal operations cause fluctuations in bandwidth requirements of the internal operations. In turn, these fluctuations cause fluctuating bandwidth availability for the performance of host operations.

As will be explained in greater detail, the bandwidth balancing system reduces or eliminates bandwidth availability fluctuations by normalizing the validity counts of various memory blocks. In an example, the validity counts of the memory blocks are normalized by enabling one or more memory blocks of the data storage device to store both random data and sequential data. Random data and sequential data may be stored in the one or more memory blocks as part of a host operation and/or as part of an internal operation.

For example, the bandwidth balancing system intelligently mixes random data and sequential data within a memory block, which leads to normalized and/or uniform internal operation bandwidth utilization. As a result, bandwidth availability for host operations is also normalized.

Accordingly, examples of the present disclosure describe a method that includes logically dividing a memory block of a memory device into a plurality of sub-blocks. In an example, a first portion of the plurality of sub-blocks is allocated to store sequential data and a second portion of the plurality of sub-blocks is allocated to store random data. The method also includes determining a randomness factor associated with the memory block. In an example, the randomness factor is based, at least in part, on one or more of an amount of sequential data being stored in the memory block and an amount of random data being stored in the memory block. The memory block is selected for a relocation operation based, at least in part, on the randomness factor.

Other examples describe a data storage device that includes a controller and a bandwidth balancing system. The bandwidth balancing system is operable to determine a randomness factor associated with a memory block of the data storage device. In an example, the randomness factor is based, at least in part, on an amount of sequential data being stored in the memory block. The bandwidth balancing system is also operable to select the memory block for a relocation operation based, at least in part, on the randomness factor.

Still other examples describe a data storage device that includes means for determining a randomness factor associated with a memory block of the data storage device. In an example, the randomness factor is based, at least in part, on an amount of random data being stored in the memory block. The data storage device also includes means for selecting the memory block for a relocation operation based, at least in part, on the randomness factor.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
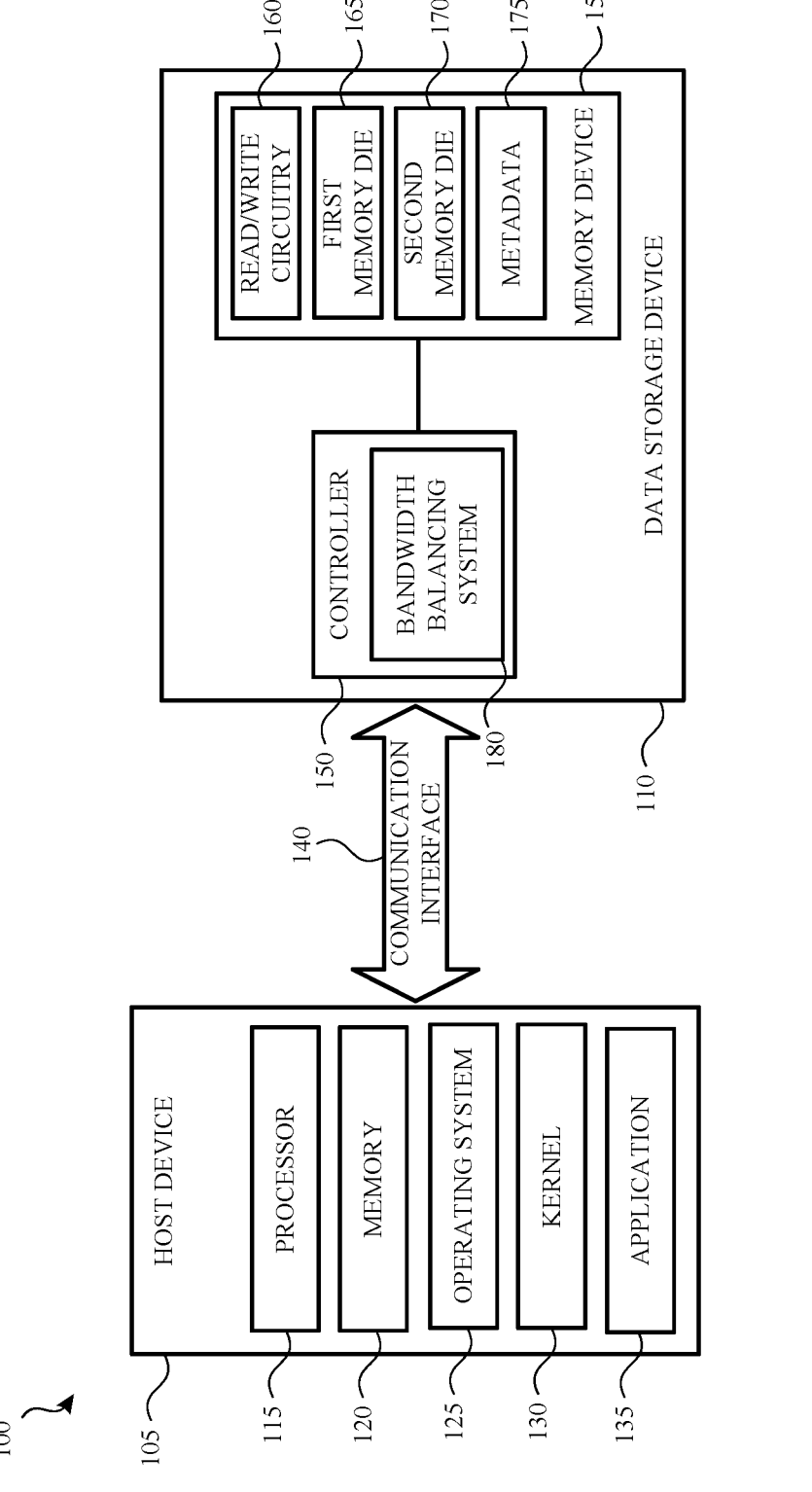
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Data storage devices typically include two partitions—a cache partition and a primary storage partition. The cache partition includes a number of single-level cell (SLC) memory blocks and the primary storage partition includes a number of quad-level cell (QLC) memory blocks. Host operations, such as write operations, are typically performed on the cache partition. Internal operations, such as relocation operations (e.g., compaction, folding, wear leveling) and/or garbage collection operations, are used to move data from the cache partition to the primary storage partition (or vice versa) and/or to free memory blocks for subsequent operations.

However, the data storage device has a limited amount of bandwidth available for the host operations and the internal operations. In current solutions, the amount of bandwidth that is allocated to the various operations fluctuates based on a number of factors. These factors include an amount of available memory blocks in the data storage device, the type and/or number of relocation operations that need to be performed and/or a validity count associated with each memory block.

If sufficient bandwidth is not provided to the internal operations, a sufficient amount of memory blocks may not be freed or allocated for subsequently received host operations (e.g., write commands). As a result, the data storage device may enter a read-only mode. However, if sufficient bandwidth is not provided to the host operations, the performance of the data storage device will be negatively impacted. These issues are further exacerbated as the validity count of the various memory blocks fluctuate.

For example, a data storage device may include a number of one gigabyte (GB) memory blocks and store a four GB file of sequential data (e.g., a video file). In this example, the four GB file is spread across four different memory blocks. During a relocation operation (e.g., a folding operation), the data in each of the source memory blocks (e.g., each of the one GB memory blocks) is folded into a single QLC destination. The source memory blocks are then invalidated. However, invalidation of the source memory blocks causes the validity count of the memory blocks to significantly and suddenly drop, which leads to high internal operation bandwidth requirements and low bandwidth availability for host operations. The bandwidth may continue to fluctuate as additional host operations are received.

This issue is also present when the relocation operation is a compaction operation. A compaction operation is one in which data in one or more memory blocks having a low validity count are moved/compacted into a single memory block.

For example, the data storage device may have a number of four GB memory blocks. Additionally, a number of different two GB files of sequential data (e.g., a number of different video files) may be stored in separate four GM memory blocks. In this example, the compaction operation compacts two of the two GB files to a single memory block. As part of the compaction process (or as a result of the compaction process) the source memory blocks (e.g., the two memory blocks that included the two GB files that were compacted) are invalidated. As a result, the validity count of the source memory blocks is zero and the host may be allocated the entire amount of bandwidth to perform its operations.

However, if only one of the source memory blocks is invalidated, the validity count would not fluctuate as much. As a result, the host operations would only receive fifty percent of the available bandwidth. Therefore, there is a lot of bandwidth fluctuation based on, for example, fluctuations of the validity count.

To address the above, the present application describes a data storage device (e.g., a NAND data storage device), that includes a bandwidth balancing system. The bandwidth balancing system is operable to reduce or eliminate bandwidth fluctuations or variations that occur as a result of the performance of various internal operations.

As will be explained in greater detail, the bandwidth balancing system normalizes the validity count of various memory blocks (or causes the validity count of the various memory blocks to be more uniform when compared with current solutions). In an example, the validity count of each memory block is normalized by enabling one or more memory blocks of the data storage device to store both random data and sequential data.

For example, each of the one or more memory blocks are divided into zones or sub-blocks. Additionally, a first portion of the zones or sub-blocks is allocated for random data and a second portion of the zones of sub-blocks is allocated for sequential data. In an example the sub-blocks or zones may be any size. Additionally, the allocations may be any size/ percentage of the available capacity of the memory block.

As data is received (e.g., from a host device), the bandwidth balancing system determines whether the data is random or sequential. Based on the determination, the bandwidth balancing system causes the data to be written to the various portions of one or more of the memory blocks. The bandwidth balancing system also determines a randomness factor associated with one or more of the memory blocks.

In an example, the randomness factor is a number or a value (e.g., from 0 to 100) that is based on a number of factors. These factors include, but not limited to, a number and/or a length of data fragments in the memory block, how data is grouped within the memory block and/or the probability of the data fragments being invalidated at a single time. In an example, a randomness factor of 100 indicates that every unit of data (e.g., every physical page) of the memory block is random while a randomness factor of 0 indicates that the memory block is storing only sequential data.

In an example, the randomness factor of the memory block can be determined at any time. For example, the bandwidth balancing system determines the randomness factor of a memory block when an internal operation (e.g., a relocation operation or a garbage collection operation) is to be executed. In another example, the bandwidth balancing system determines the randomness factor of a memory block upon completion of a write command on the memory block. The bandwidth balancing system may use any available source to determine the randomness factor including, but not limited to, pre-trained machine learning models, heuristics and the like.

When an internal operation is to be performed, the bandwidth balancing system determines the randomness factor of one or more memory blocks that will be affected by, or included with, the internal operation. The execution of the internal operation is based, at least in part, on the randomness factor.

In an example, the randomness factor helps normalize the validity count of the various memory blocks. For example, because a memory block may include both sequential data and random data, the probability that the entire memory block will be invalided, and have its validity count significantly drop as the result of a single operation, is lower when compared with current solutions. As such, bandwidth fluctuations can be avoided.

Accordingly, many technical benefits may be realized including, but not limited to, providing uniform host bandwidth and internal bandwidth for data storage devices and enabling the data storage device to have a minimum performance guarantee.

These benefits, along with other examples, will be shown and described in greater detail with respect to FIG. 1-FIG. 8.

FIG. 1 is a block diagram of a system 100 that includes a host device 105 and a data storage device 110 according to an example. In an example, the host device 105 includes at least one processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 can be used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes or is otherwise associated with a kernel 130. The kernel 130 includes instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes at least one controller 150 and at least one memory device 155. The controller 150 may be communicatively coupled to the memory device 155. In an example, the data storage device 110 may include multiple controllers and/or multiple memory devices. In such an example, one controller is responsible for executing a first operation or set of operations (e.g., on a first memory device) and a second controller is responsible for executing a second operation or set of operations (e.g., on the first memory device or the second memory device).

In an example, the memory device 155 includes one or more memory dies (e.g., first memory die 165 and second memory die 170). Although two memory dies are shown, the memory device 155 may include any number of memory dies (e.g., one memory die, two memory dies, eight memory dies, or another number of memory dies). Additionally, although memory dies are specifically mentioned, the memory device 155 may include any non-volatile memory device, storage device, storage elements or storage medium including NAND flash memory cells and/or NOR flash memory cells.

The memory cells can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

In an example, each memory block of each memory die is divided into sub-blocks or zones. Additionally, some of the sub-blocks or zones are allocated to store random data while other sub-blocks or zones are allocated to store sequential data. For example, a first portion of a memory block is allocated to store sequential data while a second portion of the memory block is allocated to store random data.

In such examples, a size of each sub-block or zone may vary. For example, if the memory block is a one gigabyte (GB), each sub-block or zone may be one kilobyte (KB). As such, the memory block may be divided into one-thousand twenty-four sub-blocks or zones. In another example, each sub-block or zone is four KBs. As such, the memory block is divided into two hundred fifty-six sub-blocks or zones. Although specific sizes and numbers are given, these are for example purposes only.

As previously discussed, some of the sub-blocks or zones are allocated for random data while some of the sub-blocks or zones are allocated for sequential data. For example, one or more memory blocks of the first memory die 165 may be configured to store 25% sequential data and 75% random data. In another example, one or more memory blocks of the first memory die 165 may be configured to store 50% sequential data and 50% random data. Although specific examples are given, the allocation of sequential data to random data and/or the number/size of sub-blocks or zones may vary and/or may be changed/updated-even from memory block to memory block and/or from memory die to memory die.

In an example, the data storage device 110 and/or the memory device 155 includes or is otherwise associated with a first partition and a second partition. Each partition includes a different type of memory blocks. For example, the first partition is identified as a cache partition and include a number of SLC memory blocks. The second partition is identified as a primary storage partition and includes a number of QLC memory blocks. Although QLC memory blocks are specifically mentioned, the primary storage partition may include MLC memory blocks, TLC memory blocks, and/or PLC memory blocks. Additionally, the data storage device 110 may implement a hybrid architecture. As such, a subset of the QLC memory blocks may be identified as hybrid memory blocks. Accordingly, each hybrid memory block may be programmable in a first mode (e.g., a QLC mode) or a second mode (e.g., a SLC mode).

In some examples, the data storage device 110 is attached to, or embedded within, the host device 105. In another example, the data storage device 110 may be implemented as an external device or a portable device that can be communicatively or selectively coupled to the host device 105. In yet another example, the data storage device 110 is a component (e.g., a solid-state drive (SSD)) of a network accessible data storage system, a network-attached storage system, a cloud data storage system, and the like.

The memory device 155 may also include support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

The memory device 155 may also store metadata 175. The metadata 175 may include information about the memory device 155 and/or information about each of the first memory die 165 and/or the second memory die 170. For example, the metadata 175 indicates whether one or more memory blocks of each memory die stores random data, sequential data and/or a combination of random and sequential data (and a percentage of random/sequential data). Additionally, the metadata 175 includes a randomness factor associated with each memory block of each memory die and/or a validity count of each memory block associated with each memory die.

In another example, the metadata 175 includes information regarding whether two or more memory blocks store sequential data associated with the same file. For example, if four memory blocks of the first memory die 165 store different portions of a large video file, the metadata 175 indicates that each of the four memory blocks include sequential data and are associated with one another. A bandwidth balancing system 180 associated with the controller 150 will use this information during a relocation operation (e.g., a folding operation) to help ensure that all four source memory blocks are not included in the same destination memory block, thereby affecting the randomness factor of the destination memory block.

As previously described, the data storage device 110 includes at least one controller 150. The controller 150 is communicatively coupled to the memory device 155 via a bus, an interface or other communication circuitry. In an example, the communication circuitry includes one or more channels which enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receive data from the host device 105 via the communication interface 140. The controller 150 may also send data and/or commands to, and/or receive data from, the memory device 155.

In an example, the controller 150 sends data and a corresponding write command to the memory device 155 to cause the memory device 155 to store data at a specified address of the memory device 155. In an example, the write command specifies a physical address of a portion of the memory device 155. The controller 150 may also send data and/or commands associated with one or more background scanning operations, garbage collection operations, and/or wear leveling operations.

The controller 150 may also send one or more read commands to the memory device 155. In an example, the read command specifies the physical address of a portion of the memory device 155 at which the data is stored. The controller 150 may also track the number of program/erase cycles or other programming operations that have been performed on or by the memory device and/or the memory dies of the memory device 155.

In an example, the controller 150 includes, or is otherwise associated with, a bandwidth balancing system 180. The bandwidth balancing system 180 may be a packaged functional hardware unit designed for use with other components/systems, a portion of a program code (e.g., software or firmware) executable by a processor or processing circuitry, or a self-contained hardware and/or software component that interfaces with other components and/or systems.

The bandwidth balancing system 180 monitors a validity count of one or more memory blocks of each of the first memory die 165 and the second memory die 170. The bandwidth balancing system 180 also balances the validity count and/or causes the validity count of the various memory blocks to be more uniform when compared with current solutions. In an example, the validity count of the memory blocks are normalized by enabling one or more memory blocks of the first memory die 165 and/or the second memory die 170 to store random data and sequential data such as previously described.

For example, as data is received from the host device 105, the bandwidth balancing system 180 determines whether the data is random or sequential. In an example, the bandwidth balancing system 180 determines whether the data is random or sequential using various techniques including, but not limited to, recent history tracking, host hints and the like.

Based, at least in part, on the determination, the bandwidth balancing system 180 causes the received data to be written to various portions of one or more memory blocks. For example, if the received data is random data, the random data is written to one or more sub-blocks or zones of a memory block that has been allocated to store random data.

However, if the received data is sequential data, the sequential data is written to one or more sub-blocks or zones of the memory block that have been allocated to store sequential data. In an example, the sequential data need not be totally sequential in the memory block (beyond a minimum granularity).

In an example, if an amount of received data exceeds the allocated percentage, another memory block may be opened and accessed and the write operation continues in the newly opened memory block. For example, if sequential data is being written to a first memory block of the first memory die 165, and 25% of the first memory block has been allocated to store sequential data, the bandwidth balancing system 180 will open and/or access a second memory block of the first memory die 165 should the amount of sequential data exceed the 25% allocation. The opening of new memory blocks may continue until the sequential data is entirely written.

In another example, the opening of new memory blocks continues until a threshold number of memory blocks have been opened/accessed. In an example, if the threshold number of memory blocks have been opened/accessed and there is still sequential data to be written, the bandwidth balancing system 180 may adjust or change the allocation of random data to sequential data for a subsequent memory block. In another example, the bandwidth balancing system 180 may adjust or change the allocation of random data to sequential data for a memory block that was previously written, and resume storing the sequential data in the previously written memory block.

In another example, if a memory block is open for over a threshold amount of time and does not include the allocation of random data and/or sequential data, the bandwidth balancing system 180 may reconfigure the allocations. For example, if a memory block includes allocations of 25% sequential data and 75% random data, and the allocation of sequential data is full (and the allocation of random data is not filled after a threshold amount of time has passed), the bandwidth balancing system 180 adjusts the allocation to prevent the memory block from continuing to stay open. In an example, adjusting the allocation includes any adjustment, including enabling the entire memory block to store the same type of data.

The bandwidth balancing system 180 also determines a randomness factor associated with one or more of the memory blocks of one or more of the memory dies of the memory device 155. In an example, the randomness factor is a number or a value (e.g., from 0 to 100) that is based on a number of factors. In an example, the factors include, but are not limited to, a number and/or a length of data fragments in the memory block, how data is grouped within the memory block and/or the probability of the data fragments being invalidated at a single time. For example, a randomness factor of '100' indicates that every unit of data (e.g., every physical page) of the memory block is random and a randomness factor of '0' indicates that the memory block is storing only sequential data.

In an example, the bandwidth balancing system 180 determines the randomness factor of the memory block at any time. For example, the bandwidth balancing system 180 determines the randomness factor of the memory block when an internal operation (e.g., a relocation operation or a garbage collection operation) is to be executed. In another example, the bandwidth balancing system 180 determines the randomness factor of the memory block upon completion of a write operation. In an example, the bandwidth balancing system uses any available source to determine the randomness factor including, but not limited to pre-trained machine learning models, heuristics and the like.

In some examples, when an internal operation is to be performed, the bandwidth balancing system 180 determines the randomness factor of one or more memory blocks that will be affected by, or included with, the internal operation. The execution of the internal operation is based, at least in part, on the randomness factor.

For example, if the internal operation is a folding operation (e.g., in which four source SLC memory blocks are combined into a single QLC memory block), the bandwidth balancing system 180 intelligently identifies one or more of the source blocks based, at least in part, on the randomness factor associated with each of the one or more source blocks to decrease the level of validity count variation among the various QLC memory blocks. For example, one of the source memory blocks may include random data (or a high randomness factor) while the other three memory blocks include sequential data (or have a low randomness factor). In an example, the number of random memory blocks and/or sequential memory blocks that are to be combined (and/or a randomness factor to be achieved by the combination of randomness factors associated with each memory block) can be configurable and/or can be dynamically determined.

In another example, the internal operation is a compaction operation. In a compaction operation, data in memory blocks having a low validity count are moved/compacted into a single memory block (e.g., a destination memory block). In this example, a first portion of the destination memory block is reserved for random data and a second portion of the destination memory block is reserved for sequential data. In an example, the reservation of random data and sequential data is based, at least in part, on a desired randomness factor.

The compaction operation is then executed based, at least in part, on how the portions are allocated. In some examples, one portion of the destination memory block may be filled before another portion. For example, the sequential portion of the destination memory block may be filled before the random portion. In such a situation, the bandwidth balancing system 180 will open a new destination memory block the sequential data. In an example, this may continue until a threshold number of destination memory blocks have been opened. In examples in which all of the destination memory blocks for sequential data have been filled, the portions of one or more of the destination memory blocks that were reserved for random data may be used.

In an example, the same is true for random data. For example, if more random data is received than sequential data and a threshold number of destination memory blocks have been opened to store random data, the random data may be written in portions of one or more of the destination memory blocks that were reserved for sequential data. In an example, these compaction operations will have almost no impact on the sequential I/O performance of the host device 105 and/or the data storage device 110 because a reasonably high percentage of space in a memory block is reserved for sequential data.

As previously explained, the randomness factor helps normalize the validity count of the various memory blocks. For example, because a memory block may include both sequential data and random data, the probability that the entire memory block will be invalided, and have its validity count significantly drop as the result of a single operation, is lower when compared with current solutions. As such, bandwidth fluctuations can be avoided.

11

Figure 2:
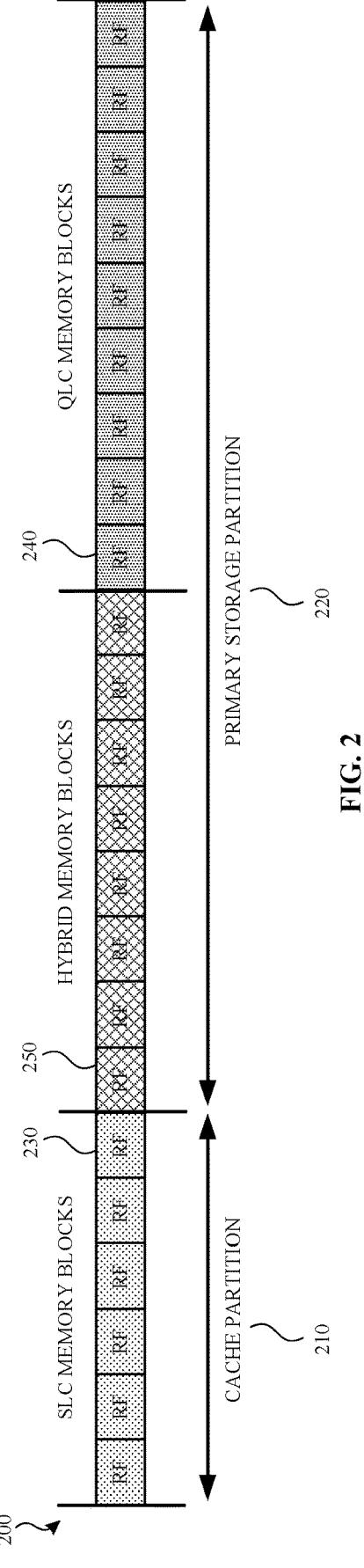
FIG. 2 illustrates a memory device having a first partition and a second partition according to an example.

FIG. 2 illustrates a memory device 200 having a first partition and a second partition according to an example. In an example, the memory device 200 is similar to the memory device 155 shown and described with respect to FIG. 1.

As previously indicated, the memory device 200 has two partitions. In an example, the first partition is a cache partition 210 and the second partition is a primary storage partition 220. The cache partition 210 includes memory blocks of a first type. For example, the cache partition 210 includes a number of SLC memory blocks 230. The primary storage partition 220 includes memory blocks of a second type. For example, the primary storage partition 220 includes a number of QLC memory blocks 240.

In an example, the memory device 200 also implements a hybrid architecture. As such, the memory device 200 includes a number of hybrid memory blocks 250. The hybrid memory blocks 250 may be QLC memory blocks that are part of the primary storage partition 220. However, the hybrid memory blocks 250 are also programmable in different modes. For example, the hybrid memory blocks 250 are programmable in a SLC mode or a QLC mode. When the hybrid memory blocks 250 are programmed in the QLC mode, they are included in the primary storage partition 220. However, when the hybrid memory blocks 250 are programmed in the SLC mode, they may be included, along with the SLC memory blocks 230, as part of a hybrid cache 260.

In an example, the memory device 200 is associated with a bandwidth balancing system. In an example, the bandwidth balancing system is similar to the bandwidth balancing system 180 shown and described with respect to FIG. 1. The bandwidth balancing system periodically or continuously monitors the state of the cache partition 210 and the primary storage partition 220 including, but not limited to, monitoring a randomness factor (RF) associated with one or more of the memory blocks.

Figure 3:
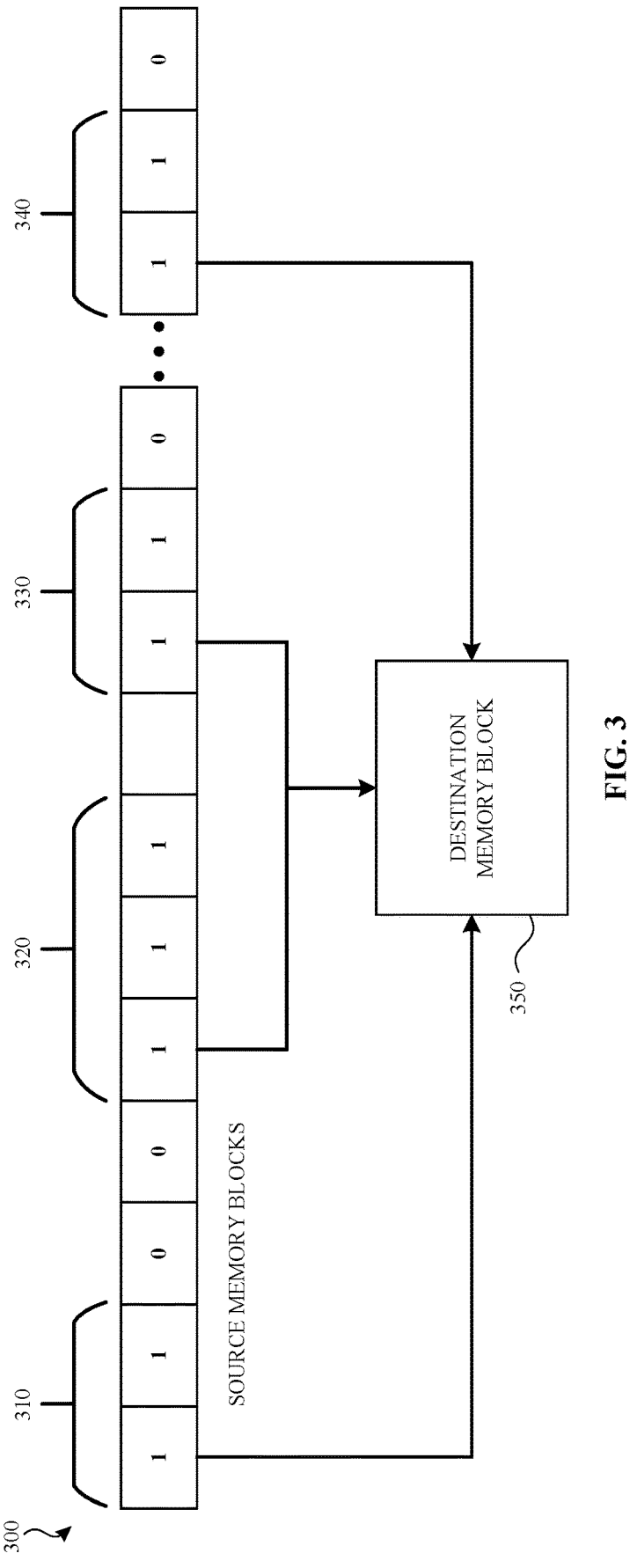
FIG. 3 illustrates how multiple source memory blocks are folded into a destination memory block as part of a folding operation according to an example.

FIG. 3 illustrates how multiple source memory blocks 300 are folded into a destination memory block 350 as part of a folding operation according to an example. In an example, the source memory blocks 300 are SLC memory blocks such as, for example, the SLC memory blocks 230 shown and described with respect to FIG. 2. Additionally, the destination memory block 250 is a QLC memory block such as, for example, the QLC memory block 240 shown and described with respect to FIG. 2.

In this example, the source memory blocks 300 include sequential data and random data. For example, the source memory blocks 300 include four groups of sequential data-Sequential Data Group 1 310, Sequential Data Group 2 320, Sequential Data Group 3 330 and Sequential Data Group 4 340. As shown, some of the sequential data groups include the same (or a similar amount of data) and some sequential data groups include different amounts of data.

In examples such as this, a bandwidth balancing system (e.g., the bandwidth balancing system 180 (FIG. 1)) identifies each group of sequential data. For example, the bandwidth balancing system may maintain a group bitmap (or other identifier) to help ensure that at least X (e.g., one or more (configurable)) source memory blocks 300 having sequential data is not associated with (or sequential to) the other source memory blocks 300 that have sequential data.

In an example, the group bitmap includes a '1' for each memory block that includes sequential data. For example, each string of '1s' indicate that the data in those memory blocks is sequential. Additionally, a '0' implies discontinuity. The bandwidth balancing system uses the group bitmap to help ensure the source memory blocks are picked up from different sequential data groups. In an example, the group bitmap is used in lieu of, or in addition to, the randomness factor.

For example, the bandwidth balancing system selects a first memory block from Sequential Data Group 1 310, the first memory block from Sequential Data Group 2 320, the first memory block from Sequential Data Group 3 330 and the first memory block from Sequential Data Group 4 340 as source memory blocks. These memory blocks are then folded into the destination memory block 350. Because the four source memory blocks are picked from different sequential groups, if one of the sequential files is invalidated, the validity count associated with source memory blocks 300 and/or the destination memory block 350, will not suddenly become zero. As such, bandwidth fluctuations will be avoided.

Figure 4:
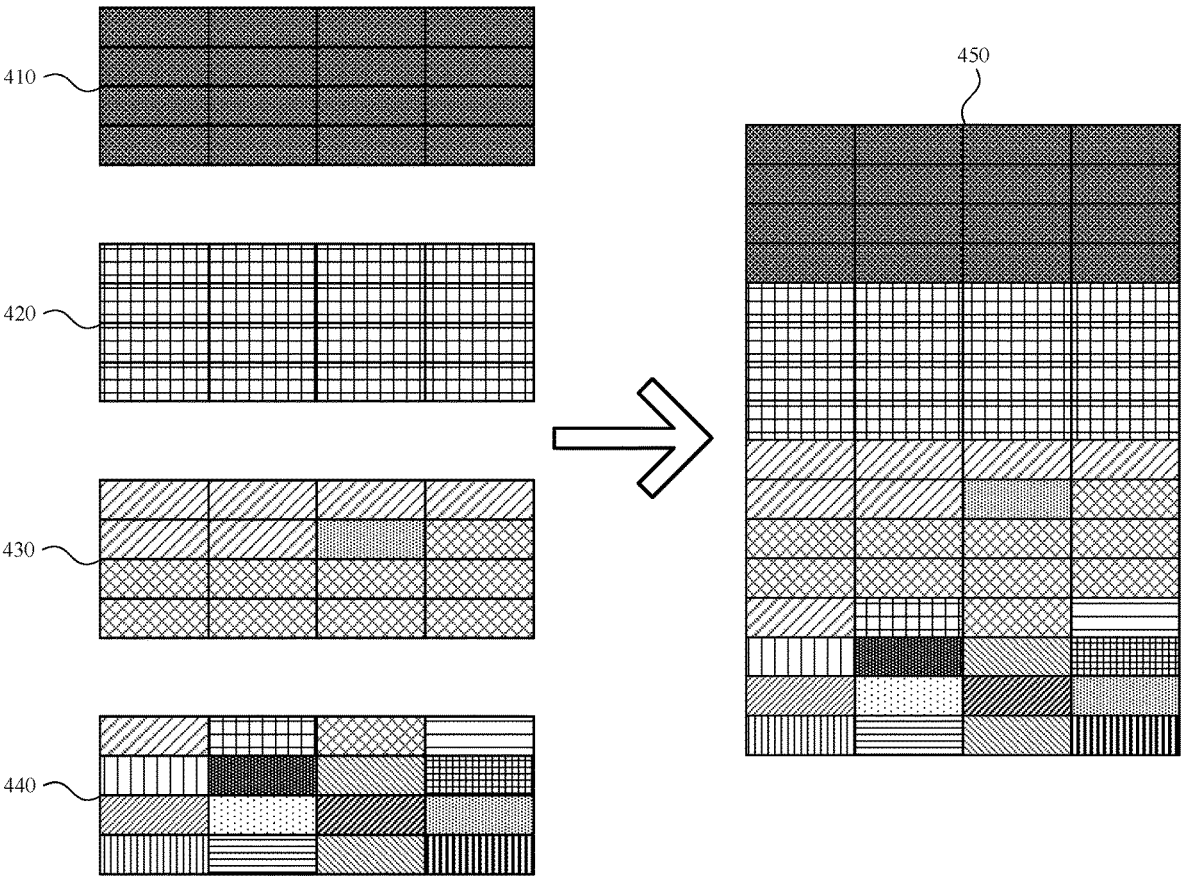
FIG. 4 illustrates how multiple source memory blocks are folded into a destination memory block as part of a folding operation according to another example.

FIG. 4 illustrates how multiple source memory blocks are folded into a destination memory block 450 as part of a folding operation according to another example. In an example, the source memory blocks (e.g., a First Source Memory Block 410, a Second Source Memory Block 420, a Third Source Memory Block 430 and a Fourth Source Memory Block 440) are SLC memory blocks such as, for example, the SLC memory blocks 230 shown and described with respect to FIG. 2. Additionally, the destination memory block 450 is a QLC memory block such as, for example, the QLC memory block 240 shown and described with respect to FIG. 2.

In this example, the source memory blocks include sequential data and random data. For example, the First Source Memory Block 410 and the Second Source Memory Block 420 include sequential data (represented by the shaded boxes). In this example, the sequential data in the Second Source Memory Block 420 is not associated with, or sequential to, the sequential data in the First Source Memory Block 410. However, it is contemplated that the two or more of the source memory blocks can include sequential data associated with the same file.

Additionally, the Third Source Memory Block 430 includes a first portion of sequential data (represented by the first pattern), random data (represented by the second pattern) and a second portion of sequential data (represented by the third pattern). In an example, the first portion of sequential data is not associated with the second portion of sequential data. However, in other examples, the first portion of sequential data may be associated with the second portion of sequential data. The Fourth Source Memory Block 440 only includes random data (represented by the different patterns).

In this example, a bandwidth balancing system (e.g., the bandwidth balancing system 180 (FIG. 1)) identifies a randomness factor associated with each source memory block. For example, the bandwidth balancing system determines that the randomness factor associated with the First Source Memory Block 410 and the Second Source Memory Block 420 is '0'. The bandwidth balancing system also determines that the randomness factor associated with the Third Source Memory Block 430 is '8' and that the randomness factor associated with the Fourth Source Memory Block 440 is '100'. The bandwidth balancing system may also determine that the destination memory block 450 has a desired randomness factor (or a randomness factor threshold) of at least '25'.

Based on the randomness factor of each of the source memory blocks (e.g., $(0+0+8+100)/4=27$)), the bandwidth balancing system determines that the randomness factor threshold of '25' would be met if the source memory blocks are combined. As such, the bandwidth balancing system causes each of the source memory blocks to be folded into the destination memory block 450. In an example, the number of random memory blocks, and the number of sequential memory blocks, as well as the randomness factor threshold, is configurable or can be dynamically determined (e.g., based on, for example an operating state of a data storage device).

In some examples, the identification and selection of source memory blocks described with respect to FIG. 3 can be combined with the identification and selection of source memory blocks described with respect to FIG. 4.

Figure 5:
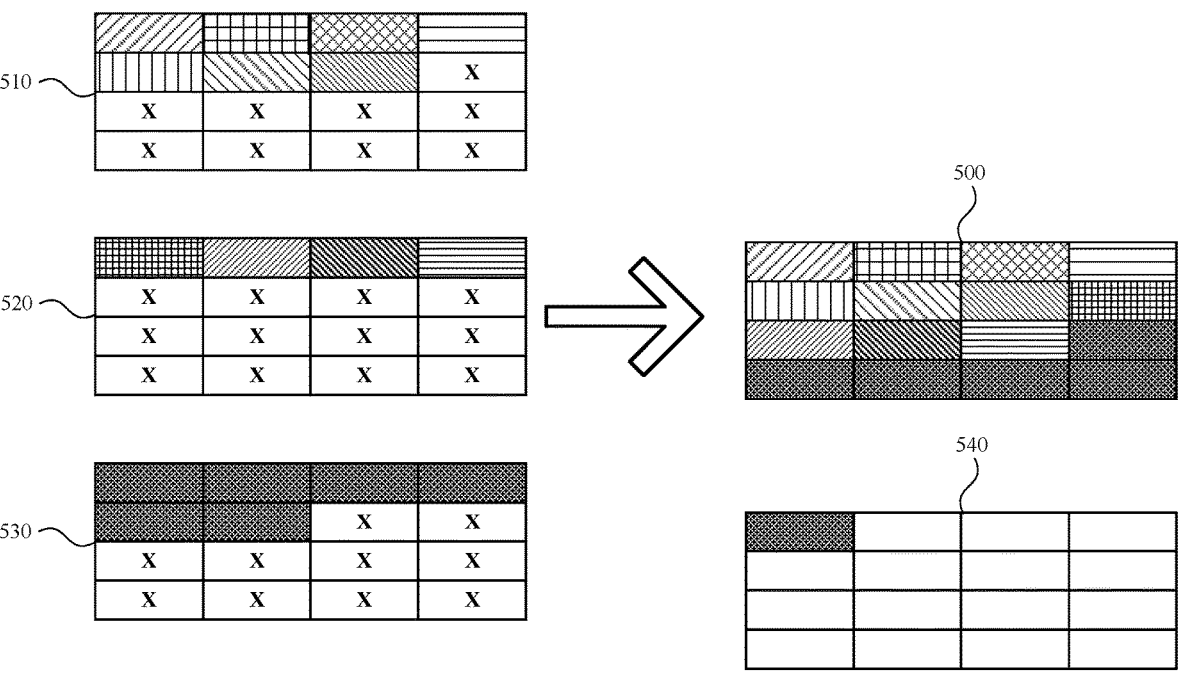
FIG. 5 illustrates how source memory blocks are combined within a destination memory block as part of a compaction operation according to an example.

FIG. 5 illustrates how source memory blocks are combined within a destination memory block 500 as part of a compaction operation according to an example. In an example, the source memory blocks (e.g., a First Source Memory Block 510, a Second Source Memory Block 520 and a Third Source Memory Block 530) are SLC memory blocks such as, for example, the SLC memory blocks 230 shown and described with respect to FIG. 2. Additionally, the destination memory block 500 is a QLC memory block such as, for example, the QLC memory block 240 shown and described with respect to FIG. 2. However, in other examples, the source memory blocks are QLC memory blocks and the destination memory block 500 is a SLC memory block. In yet other examples, the source memory blocks and the destination memory block 500 are SLC memory blocks.

In an example, some of the source memory blocks include random data and some of the source memory blocks include sequential data. For example, the First Source Memory Block 510 and the Second Source Memory Block 520 include random data (represented by the different patterns) and the Third Source Memory Block 530 includes sequential data (represented by a single pattern). Additionally, each source memory block has a validity count (represented by the 'X') below a configurable, or a determined, validity count threshold (e.g. represented by the number of filled rectangles).

In this example, a bandwidth balancing system (e.g., the bandwidth balancing system 180 (FIG. 1)) identifies a randomness factor associated with each source memory block and also identifies the destination memory block 500. In an example, the destination memory block 500 has a configurable percentage of space is reserved for random data and/or a configurable percentage of space reserved from sequential data. Additionally, the bandwidth balancing system also determines a desired randomness factor for the destination memory block 500.

As such, when selecting source memory blocks for the compaction operation, the bandwidth balancing system selects or identifies source memory blocks that will cause the destination memory block 500 to have, or otherwise be associated with, the desired randomness factor (or have a randomness factor that falls within a range of randomness factors or is above/below a randomness factor threshold).

Continuing with the example, as part of the compaction operation, the bandwidth balancing system identifies a validity count associated with each source memory block and a randomness factor associated with each source memory block and also determines that the desired randomness factor will be achieved should the data in the source memory blocks be combined in the destination memory block 500.

As such, the bandwidth balancing system causes the compaction operation to be executed in which the valid data from each source memory block is compacted or combined within the destination memory block 500. In examples, in which sequential portion of the destination memory block 500 is filled (and the random portion of the destination memory block 500 is either filled or not filled), an additional destination memory block 540 may be opened (and vice versa).

Figure 6:
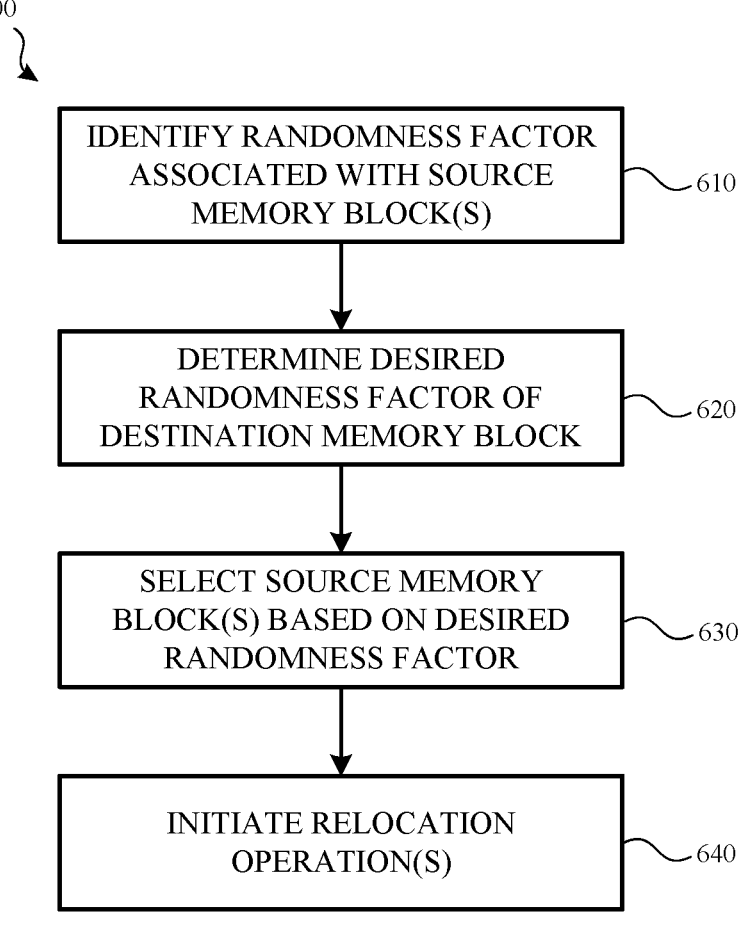
FIG. 6 illustrates a method for performing a relocation operation according to an example.

FIG. 6 illustrates a method 600 for performing a relocation operation according to an example. In an example, the method 600 may be performed by a bandwidth balancing system (e.g., the bandwidth balancing system 180) of a data storage device such as, for example, the data storage device 110 shown and described with respect to FIG. 1.

The method 600 begins when the bandwidth balancing system identifies (610) a randomness factor associated with one or more source memory blocks. In an example, the randomness factor is identified or determined based, at least in part, on completion of a write operation. For example, when a controller of the data storage device causes data to be written to a particular memory block, the bandwidth balancing system determines the randomness factor associated with that particular memory block. In another example, the randomness factor of the memory block is determined when an internal operation (e.g., a relocation operation and/or a garbage collection operation) is initiated and/or executed.

The bandwidth balancing system also determines (620) a desired randomness factor of a destination memory block. In an example, the desired randomness factor of the destination memory block is based, at least in part, on a type of internal operation being performed. For example, the destination memory block may have a first desired randomness factor if the internal operation is a compaction operation and have a second desired randomness factor if the internal operation is a folding operation.

In another example, the desired randomness factor of the destination memory block may be based, at least in part, on an operating state of the data storage device. For example, the randomness factor may be different depending on an amount of available memory blocks (e.g., whether the data storage device is operating in a burst mode, a sustained mode, an urgent mode or a super urgent mode) in the data storage device. Although specific examples are given, the desired randomness factor may be determined on a number of different factors/criteria.

When the desired randomness factor is determined, the bandwidth balancing system selects (630) a source memory block. In an example, the source memory block is selected based, at least in part, on the determined randomness factor. For example, the source memory block may be configured to store different amounts of random data and sequential data. Additionally, the different amounts of random data and sequential data may impact the resulting randomness factor and/or validity count.

Once the destination memory block is identified, the bandwidth balancing system initiates (640) the relocation operation. In an example, the relocation operation includes opening one or more destination memory blocks based, at least in part, on the type of data being received, the randomness factor, and/or on whether the destination memory block has reached capacity of a particular type of data.

Figures 7, 8:
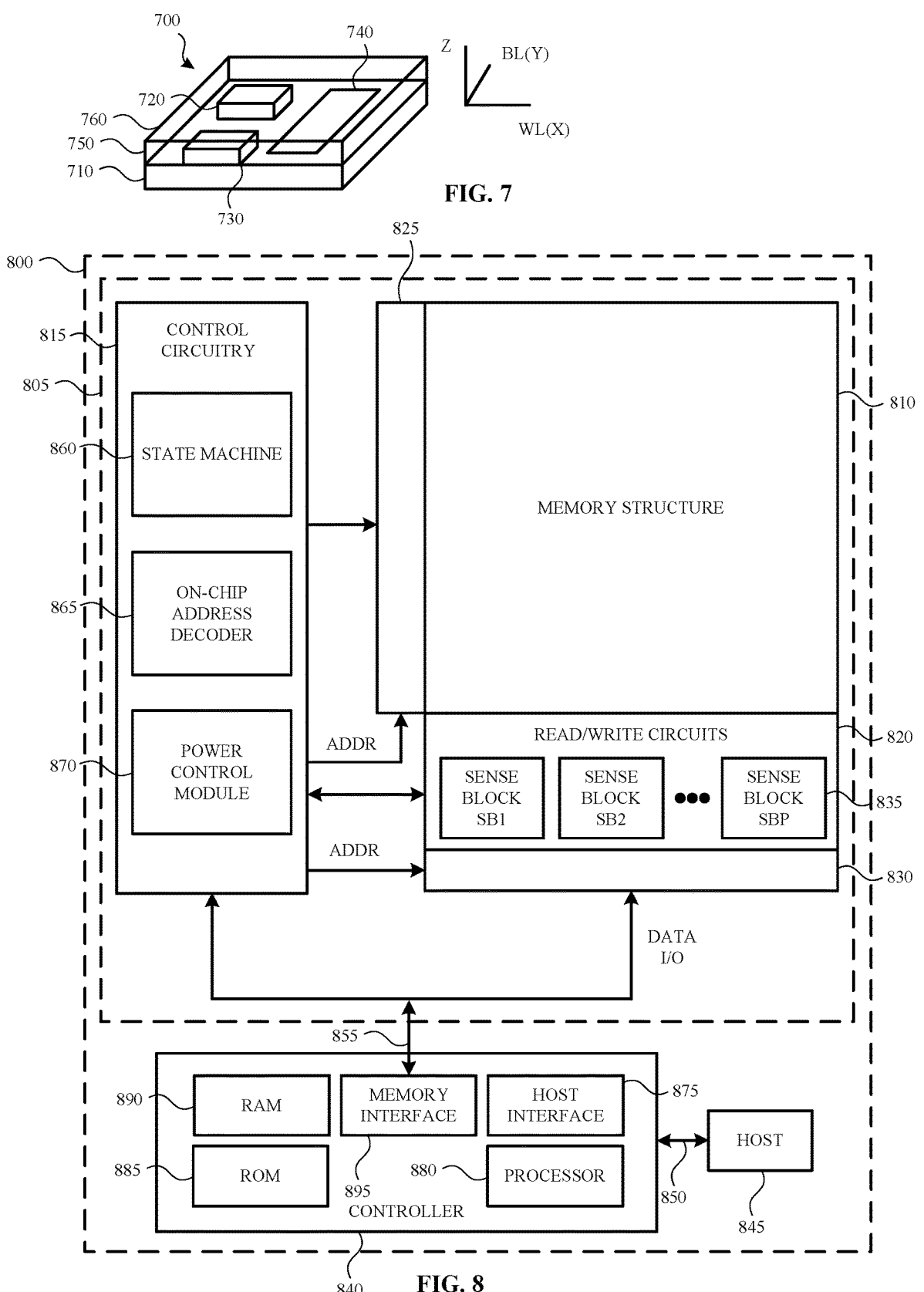
FIG. 7 is a perspective view of a storage device that includes three-dimensional (3D) stacked non-volatile memory according to an example.
FIG. 8 is a block diagram of a storage device according to an example.

FIG. 7-FIG. 8 describe example storage devices that may be used with or otherwise implement the various features described herein. For example, the storage devices shown and described with respect to FIG. 7-FIG. 8 may include various systems and components that are similar to the systems and components shown and described with respect to FIG. 1. For example, the controller 840 shown and described with respect to FIG. 8 may be similar to the controller 150 of FIG. 1. Likewise, the memory dies 805 may be similar to the first memory die 165 and/or the second memory die 170 of FIG. 1.

FIG. 7 is a perspective view of a storage device 700 that includes three-dimensional (3D) stacked non-volatile memory according to an example. In this example, the storage device 700 includes a substrate 710. Blocks of memory cells are included on or above the substrate 710. The blocks may include a first block (BLK0 720) and a second block (BLK1 730). Each block may be formed of memory cells (e.g., non-volatile memory elements). The substrate 710 may also include a peripheral area 740 having support circuits that are used by the first block and the second block.

The substrate 710 may also carry circuits under the blocks, along with one or more lower metal layers which are patterned in conductive paths to carry signals from the circuits. The blocks may be formed in an intermediate region 750 of the storage device 700. The storage device may also include an upper region 760. The upper region 760 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 710 in the x-direction represents a direction in which signal paths for word lines or control gate lines extend (e.g., a word line or drain-end select gate (SGD) line direction) and the width of the plane of the substrate 710 in the y-direction represents a direction in which signal paths for bit lines extend (e.g., a bit line direction). The z-direction represents a height of the storage device 700.

FIG. 8 is a functional block diagram of a storage device 800 according to an example. In an example, the storage device 800 may be the 3D stacked non-volatile storage device 700 shown and described with respect to FIG. 7. The components depicted in FIG. 8 may be electrical circuits. In an example, the storage device 800 includes one or more memory dies 805. Each memory die 805 includes a three-dimensional memory structure 810 of memory cells (e.g., a 3D array of memory cells), control circuitry 815, and read/write circuits 820. In another example, a two-dimensional array of memory cells may be used. The memory structure 810 is addressable by word lines using a first decoder 825 (e.g., a row decoder) and by bit lines using a second decoder 830 (e.g., a column decoder). The read/write circuits 820 may also include multiple sense blocks 835 including SB1, SB2, . . . , SBp (e.g., sensing circuitry) which allow pages of the memory cells to be read or programmed in parallel. The sense blocks 835 may include bit line drivers.

In an example, a controller 840 is included in the same storage device 800 as the one or more memory dies 805. In another example, the controller 840 is formed on a die that is bonded to a memory die 805, in which case each memory die 805 may have its own controller 840. In yet another example, a controller die controls all of the memory dies 805.

Commands and data may be transferred between a host 845 and the controller 840 using a data bus 850. Commands and data may also be transferred between the controller 840 and one or more of the memory dies 805 by way of lines 855. In one example, the memory die 805 includes a set of input and/or output (I/O) pins that connect to lines 855.

The memory structure 810 may also include one or more arrays of memory cells. The memory cells may be arranged in a three-dimensional array or a two-dimensional array. The memory structure 810 may include any type of non-volatile memory that is formed on one or more physical levels of arrays of memory cells having an active area disposed above a silicon substrate. The memory structure 810 may be in a non-volatile memory device having circuitry associated with the operation of the memory cells, whether the associated circuitry is above or within the substrate.

The control circuitry 815 works in conjunction with the read/write circuits 820 to perform memory operations (e.g., erase, program, read, and others) on the memory structure 810. The control circuitry 815 may include registers, ROM fuses, and other devices for storing default values such as base voltages and other parameters.

The control circuitry 815 may also include a state machine 860, an on-chip address decoder 865 and a power control module 870. The state machine 860 may provide chip-level control of various memory operations. The state machine 860 may be programmable by software. In another example, the state machine 860 does not use software and is completely implemented in hardware (e.g., electrical circuits).

The on-chip address decoder 865 may provide an address interface between addresses used by host 845 and/or the controller 840 to a hardware address used by the first decoder 825 and the second decoder 830.

The power control module 870 may control power and voltages that are supplied to the word lines and bit lines during memory operations. The power control module 870 may include drivers for word line layers in a 3D configuration, select transistors (e.g., SGS and SGD transistors) and source lines. The power control module 870 may include one or more charge pumps for creating voltages.

The control circuitry 815, the state machine 860, the on-chip address decoder 865, the first decoder 825, the second decoder 830, the power control module 870, the sense blocks 835, the read/write circuits 820, and/or the controller 840 may be considered one or more control circuits and/or a managing circuit that perform some or all of the operations described herein.

In an example, the controller 840, is an electrical circuit that may be on-chip or off-chip. Additionally, the controller 840 may include one or more processors 880, ROM 885, RAM 890, memory interface 895, and host interface 875, all of which may be interconnected. In an example, the one or more processors 880 is one example of a control circuit. Other examples can use state machines or other custom circuits designed to perform one or more functions. Devices such as ROM 885 and RAM 890 may include code such as a set of instructions. One or more of the processors 880 may be operable to execute the set of instructions to provide some or all of the functionality described herein.

Alternatively or additionally, one or more of the processors 880 may access code from a memory device in the memory structure 810, such as a reserved area of memory cells connected to one or more word lines. The memory interface 895, in communication with ROM 885, RAM 890, and one or more of the processors 880, may be an electrical circuit that provides an electrical interface between the controller 840 and the memory die 805. For example, the memory interface 895 may change the format or timing of signals, provide a buffer, isolate from surges, latch I/O, and so forth.

The one or more processors 880 may issue commands to control circuitry 815, or any other component of memory die

805, using the memory interface 895. The host interface 875, in communication with the ROM 885, the RAM 895, and the one or more processors 880, may be an electrical circuit that provides an electrical interface between the controller 840 and the host 845. For example, the host interface 875 may change the format or timing of signals, provide a buffer, isolate from surges, latch I/O, and so on. Commands and data from the host 845 are received by the controller 840 by way of the host interface 875. Data sent to the host 845 may be transmitted using the data bus 850.

Multiple memory elements in the memory structure 810 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art. One of skill in the art also will note that while the invention is described in terms of SLC and QLC memory blocks, in some embodiments, triple-level cell (TLC) memory blocks and multi-level cell (MLC) blocks may be substituted for QLC memory blocks.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

Based on the above, examples of the present disclosure describe a method, comprising: logically dividing a memory block of a memory device into a plurality of sub-blocks, a first portion of the plurality of sub-blocks being allocated to store sequential data and a second portion of the plurality of sub-blocks being allocated to store random data; determining a randomness factor associated with the memory block, the randomness factor being based, at least in part, on one or more of an amount of sequential data being stored in the memory block and an amount of random data being stored in the memory block; and selecting the memory block for a relocation operation based, at least in part, on the randomness factor. In an example, the method also includes changing the allocation of at least one of the first portion and the second portion based, at least in part, on an amount of sequential data received by the memory device. In an example, the relocation operation is a folding operation. In an example, the method also includes selecting an additional memory block as part of the folding operation, wherein the additional memory block is selected based, at least in part, on a randomness factor associated with the additional memory block; and performing the folding operation using the memory block and the additional memory block. In an example, the randomness factor associated with the additional memory block is different than the randomness factor of the memory block. In an example, the randomness factor associated with the memory block and the randomness factor associated with the additional memory block indicate the memory block and the additional memory block include sequential data, wherein: the sequential data of the memory block is associated with a first set of data; and the sequential data of the additional memory block is associated with a second set of data. In an example, the relocation operation is a compaction operation. In an example, the method also includes selecting a destination memory block for the compaction operation, the destination memory block having a first portion that is allocated for random data and a second portion that is allocated for sequential data; moving at least a portion of data associated with memory block to the destination memory block; and moving at least a portion of data associated with another memory block to the destination memory block, the another memory block being associated with a randomness factor. In an example the method also includes identifying another destination memory block for the compaction operation based, at least in part, on determining at least one of the first portion allocated for random data and the second portion allocated for sequential data is full.

Additional examples describe a data storage device, comprising: a controller; and a bandwidth balancing system operable to: determine a randomness factor associated with a memory block of the data storage device, the randomness factor being based, at least in part, on an amount of sequential data being stored in the memory block; and select the memory block for a relocation operation based, at least in part, on the randomness factor. In an example, the relocation operation is a folding operation. In an example, the bandwidth balancing system is further operable to: identify an additional memory block, based at least in part, on a randomness factor associated with the additional memory block; and initiate the folding operation using the memory block and the additional memory block. In an example, the randomness factor associated with the additional memory block is different than the randomness factor of the memory block. In an example, the randomness factor associated with the memory block and the randomness factor associated with the additional memory block indicate the memory block and the additional memory block include sequential data, wherein: the sequential data of the memory block is associated with a first set of data; and the sequential data of the additional memory block is associated with a second set of data that is different than the first set of data. In an example, the relocation operation is a compaction operation. In an example, the bandwidth balancing system is further operable to: identify a destination memory block for the compaction operation, the destination memory block having a first portion that is allocated for random data and a second portion that is allocated for sequential data; move at least a portion of data associated with memory block to the destination memory block; and move at least a portion of data associated with another memory block to the destination memory block, the another memory block being associated with a randomness factor.

Additional examples describe a data storage device, comprising: means for determining a randomness factor associated with a memory block of the data storage device, the randomness factor being based, at least in part, on an amount of random data being stored in the memory block; and means for selecting the memory block for a relocation operation based, at least in part, on the randomness factor. In an example, the relocation operation is a folding operation. In an example, the data storage device also includes means for identifying an additional memory block, based at least in part, on a randomness factor associated with the additional memory block; and means for initiating the folding operation using the memory block and the additional memory block. In an example, the relocation operation is a compaction operation and wherein the data storage device further comprises: means for identifying a destination memory block for the compaction operation, the destination memory block having a first portion that is allocated for random data and a second portion that is allocated for sequential data; means for moving at least a portion of data associated with memory block to the destination memory block; and means for moving at least a portion of data associated with another memory block to the destination memory block, the another memory block being associated with a randomness factor.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   logically dividing a memory block of a memory device into a plurality of sub-blocks, a first number of the plurality of sub-blocks allocated to store sequential data and a second number of the plurality of sub-blocks allocated to store random data;
   determining a randomness factor associated with the memory block, the randomness factor indicating a probability of the sequential data and the random data being invalidated using a single operation; and
   selecting the memory block for a relocation operation based, at least in part, on the randomness factor.

2. The method of claim 1, further comprising changing the allocation of at least one of the first number and the second number based, at least in part, on an amount of sequential data received by the memory device.

3. The method of claim 1, wherein the relocation operation is a folding operation.

4. The method of claim 3, further comprising:
   selecting an additional memory block as part of the folding operation, wherein the additional memory block is selected based, at least in part, on a randomness factor associated with the additional memory block; and
   performing the folding operation using the memory block and the additional memory block.

5. The method of claim 4, wherein the randomness factor associated with the additional memory block is different than the randomness factor of the memory block.

6. The method of claim 4, wherein the randomness factor associated with the memory block and the randomness factor associated with the additional memory block indicate the memory block and the additional memory block include sequential data, wherein:

the sequential data of the memory block is associated with a first set of data; and the sequential data of the additional memory block is associated with a second set of data.

7. The method of claim 1, wherein the relocation operation is a compaction operation.

8. The method of claim 7, further comprising:

selecting a destination memory block for the compaction operation, the destination memory block having a first predetermined number of sub-blocks allocated to store sequential data and a second predetermined number of sub-blocks allocated to store random data;

moving at least a portion of data associated with the memory block to the destination memory block; and moving at least a portion of data associated with another memory block to the destination memory block, the another memory block being associated with a randomness factor.

9. The method of claim 8, further comprising identifying another destination memory block for the compaction operation based, at least in part, on determining at least one of the first predetermined number of sub-blocks allocated to store sequential data and the second predetermined number of sub-blocks allocated to store random data are full.

10. A data storage device, comprising:

a controller; and a bandwidth balancing system operable to:

determine a randomness factor associated with each of a plurality of memory blocks of the data storage device, the randomness factor of each of the plurality of memory blocks being based, at least in part, on an amount of sequential data stored in each of the plurality of memory blocks;

determine a target randomness factor threshold associated with a destination memory block; and select one or more of the plurality of memory blocks for a relocation operation based, at least in part, on the randomness factor associated with the selected one or more of the plurality of memory blocks and the target randomness factor threshold associated with the destination memory block.

11. The data storage device of claim 10, wherein the relocation operation is a folding operation.

12. The data storage device of claim 11, wherein the bandwidth balancing system is further operable to:

identify an additional memory block, based at least in part, on a randomness factor associated with the additional memory block; and initiate the folding operation using the selected one or more of the plurality of memory blocks and the additional memory block.

13. The data storage device of claim 12, wherein the randomness factor associated with the additional memory block is different than the randomness factor associated with the selected one or more of the plurality of memory blocks.

14. The data storage device of claim 13, wherein the randomness factor associated with the selected one or more of the plurality of memory blocks and the randomness factor associated with the additional memory block indicate the selected one or more of the plurality of memory blocks and the additional memory block include sequential data, wherein:

the sequential data of the selected one or more of the plurality of memory blocks is associated with a first set of data; and the sequential data of the additional memory block is associated with a second set of data that is different than the first set of data.

15. The data storage device of claim 10, wherein the relocation operation is a compaction operation.

16. The data storage device of claim 15, wherein the bandwidth balancing system is further operable to:

identify a destination memory block for the compaction operation, the destination memory block having a first predetermined number of sub-blocks allocated to store sequential data and a second predetermined number of sub-blocks allocated to store random data;

move at least a portion of data associated with the selected one or more of the plurality of memory blocks to the destination memory block; and move at least a portion of data associated with another memory block to the destination memory block, the another memory block being associated with a randomness factor.

17. A data storage device, comprising:

means for determining a randomness factor associated with a memory block of the data storage device, the randomness factor being based, at least in part, on an amount of random data being stored in the memory block;

means for determining a target randomness factor threshold associated with a destination memory block; and means for selecting the memory block for a relocation operation based, at least in part, on the randomness factor associated with the memory block and the target randomness factor threshold associated with the destination memory block.

18. The data storage device of claim 17, wherein the relocation operation is a folding operation.

19. The data storage device of claim 18, further comprising:

means for identifying an additional memory block, based at least in part, on a randomness factor associated with the additional memory block; and means for initiating the folding operation using the memory block and the additional memory block.

20. The data storage device of claim 17, wherein the relocation operation is a compaction operation and wherein the data storage device further comprises:

means for identifying a destination memory block for the compaction operation, the destination memory block having a first predetermined number of sub-blocks allocated to store sequential data and a second predetermined number of sub-blocks allocated to store random data;

means for moving at least a portion of data associated with memory block to the destination memory block; and means for moving at least a portion of data associated with another memory block to the destination memory block, the another memory block being associated with a randomness factor.

* * * * *